(12) United States Patent
White

(10) Patent No.: US 11,321,567 B1
(45) Date of Patent: May 3, 2022

(54) ROUTING BASED ON TOUCH POINTS

(71) Applicant: HERE Global B.V., Eindhoven (NL)

(72) Inventor: Donta White, Racine, WI (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/074,461

(22) Filed: Oct. 19, 2020

(51) Int. Cl.
*G06K 9/00* (2006.01)
*G06F 16/29* (2019.01)

(52) U.S. Cl.
CPC ......... *G06K 9/00671* (2013.01); *G06F 16/29* (2019.01)

(58) Field of Classification Search
None
See application file for complete search history.

(56) References Cited

U.S. PATENT DOCUMENTS

| | | | |
|---|---|---|---|
| 7,259,656 B1 * | 8/2007 | Wright | G01C 21/20 340/286.14 |
| 9,460,263 B2 | 10/2016 | Holmes | |
| 10,198,779 B2 | 2/2019 | Pillmnan | |
| 2009/0177389 A1 * | 7/2009 | Wu | G01C 21/36 701/533 |
| 2015/0100330 A1 | 4/2015 | Shpits | |
| 2017/0262790 A1 * | 9/2017 | Khasis | G08G 1/0116 |
| 2018/0046722 A1 | 2/2018 | Thibault | |
| 2018/0233016 A1 | 8/2018 | Daniel | |
| 2018/0276735 A1 * | 9/2018 | Koenig | H04W 4/02 |
| 2020/0217677 A1 * | 7/2020 | Wang | G06N 7/005 |

OTHER PUBLICATIONS

Kumar, Muthukumar. "Using Location Data to Tackle the Coronavirus Pandemic." GEO Awesomeness, Mar. 30, 2020. (pp 1-5). www.geoawesomeness.com/using-location-data-to-tackle-the-coronavirus-pandemic/.

* cited by examiner

*Primary Examiner* — Jeffrey J Chow
(74) *Attorney, Agent, or Firm* — Lempia Summerfield Katz LLC

(57) ABSTRACT

System and methods are provided for gathering touch point data related to human touches or contacts for objects or materials that are likely to carry an infection, analyzing the data, generating touch score data for objects and areas, and presenting the generated data to users for use in navigating from location to location.

20 Claims, 11 Drawing Sheets

ROUTING BASED ON TOUCH POINTS

FIELD

The following disclosure relates to navigation devices or services.

BACKGROUND

Inanimate objects have been shown to play a role in the transmission of human pathogens either directly, by surface-to-mouth contact, or indirectly, by contamination of fingers and subsequent hand-to-mouth contact. Post-infection, pathogenic organisms, i.e., viruses, bacteria, and protozoa, may be excreted in large numbers in biological substances including blood, mucus, saliva, feces, and urine. Some microbes are infectious at very low doses and can survive for hours to weeks on nonporous surfaces. One common example of this is how the cold virus can be spread by people sneezing and touching door handles. In another example, objects and surfaces are thought to play a role in the spread of the SARS virus, where the virus was known to survive for up to 96 hours on environmental surfaces and longer in the presence of biological substances. Likewise, contaminated objects have been implicated in the persistence of Norovirus outbreaks between guests in a hotel and on cruise ships.

A classic example is a park water fountain from which many people drink. Infectious agents deposited by one person can potentially be transmitted to a subsequent drinker. Many objects that persons come into contact with can serve as fomites: doorknobs, sinks, paper money, elevator buttons, hand rails, phones, writing implements, keyboards, toys in a day care center, etc. These fomites (objects or materials which are likely to carry infection) may include any items that may be frequently touched by different people and infrequently cleaned. Microbes live as transient contaminants in fomites or hands where they constitute a major health hazards as sources of community acquired infections. The increasing frequency of epidemic outbreaks of certain diseases and its rate of spread from one community to the other has become a major public health anxiety.

People are typically not aware of the dangers of certain objects, surfaces, or areas even though a person might prefer to avoid such dangers. Even well-known vectors such as public restrooms, daycare centers, subways, etc. include varying degrees of danger depending on their use, hygiene upkeep, and other factors.

SUMMARY

In an embodiment, a method is provided using touch data to augment a geographic database, the method comprising: identifying, in a geographic database, a plurality of touch points for a plurality of locations; acquiring, by a processor, touch data for the plurality of touch points; calculating, by the processor, an object touch score for each of the plurality of touch points based on the touch data; calculating, by the processor, a location touch score for the plurality of locations based on object touch scores for touch points of the plurality of touch points associated with each of the plurality of locations; and augmenting, by the processor, the geographic database with the touch score for each of the plurality of touch points and plurality of locations; wherein the touch scores are configured to generate a touch aware route from a starting location to a destination location.

In an embodiment, a system is provided for generating touch point routes from a starting location to a destination. The system includes a geographic database and a processor. The geographic database is configured to store touch point scores for a plurality of potential waypoints in multiple different routes from the starting location to the destination, the touch point scores representative of an estimated number of touches of objects or materials that are likely to harbor a hazardous material at each of the plurality of potential waypoints. The processor is configured to generate one or more touch point routes comprising one or more of the potential waypoints based on the touch point scores and at least one of a shortest distance or shortest travel time from the starting location to the destination, the processor configured to provide the one or more touch point routes to a user device.

In an embodiment, a computer implemented method is provided that includes receiving, by an interface coupled with a processor, a request for a touch point route from a starting location to a destination on a rendered map; calculating, by the processor upon receipt of the selection, the touch point route from the starting location to the destination based on at least one of a shortest distance or shortest travel time from the starting location to the destination and one or more touch point scores for one or more potential waypoints in multiple different routes from the starting location to the destination, the touch point scores representative of an estimated number of touches of objects or materials that are capable of harboring a hazardous material at each of the one or more potential waypoints; and rendering and presenting, by the processor on the interface, a representation of the touch point route.

BRIEF DESCRIPTION OF THE DRAWINGS

Exemplary embodiments of the present invention are described herein with reference to the following drawings.

DETAILED DESCRIPTION

Figure 1:
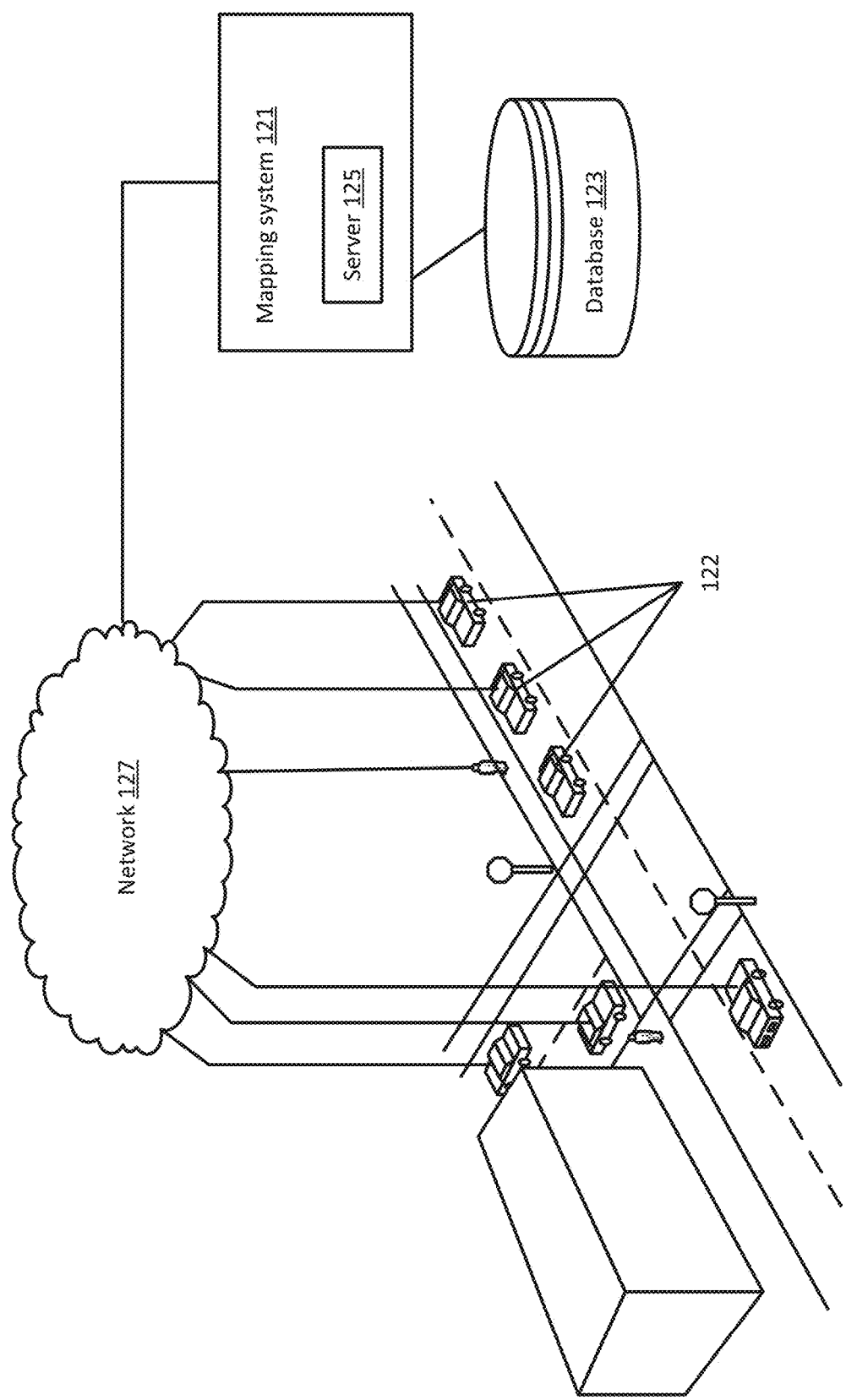
FIG. 1 depicts an example of a mapping system configured to provide touch point routing according to an embodiment.

Embodiments described herein provide systems and methods for gathering touch point data related to human touches or contacts, analyzing the data, generating touch score data for objects and areas, and presenting the generated data to users for use in navigating from location to location.

In an example, using a touch point application, a user attempts to create a route to a desired destination using the touch point application interface on a mobile smart phone, a GPS navigation system, a tablet, and/or a digital/probe device. In this example, the user is looking for a gas station for gas or electric charging port and coffee/snacks using a touch point application interface. The touch point application interface searches for and returns an optimal gas station for the user to visit based on the "known, estimated, and/or predicted touchpoints" at that destination, the user's geographic position, the user's profile (demographic information age, lifestyle data, etc.), vehicle type (small vehicle, large vehicle, truck, bicycle, etc.), gas type, availability of (rapid) electric vehicle charging stations, plus other known data. By incorporating touchpoints or touch point data into the routing algorithm, a user may be provided a safe or safer route/destination than using a standard routing algorithm.

The touch point data may be acquired and/or gathered in real-time. The touch point data may, in the example provided above, include data points such as touch point cleaning times, number of gas pumps, number of entrance and exit doors, etc. Another source to estimate/predict touch point data may come from movement from smart watches, at known touch-points like doors, gas pumps, check out areas, etc., as well as smart-phone/device movement, connected clothing, accessories, and from people & things dynamically moving, as well as stationary objects and infrastructure. Knowledge of these objects and areas (high frequency touch-points in some cases) could alert a person (user) to avoid a specific area, specific areas within a building/store/venue etc., or specific objects if, for example, the building/store/venue/object hasn't been sanitized, or if the business is frequented and/or visited by a lot of travelers or (regional or national cross-country) truck drivers from out of state and/or out-of-country (Canada or Mexico) or if it's near a hospital or drug store that has a high number of virus infected patients. A need exists to present the level of risk to users, for example, when planning a route from a starting point to a destination in order to minimize or prepare for certain risks. In an embodiment, the data among others is used during the user's route generation process. During a crisis situation (covid-19, SARS, swine flu, hazardous spill, etc.) a routing algorithm for a touch point application may give more weight to locations or waypoints with fewer touch-points or lower risk. The routing algorithm may give higher or lower weight to data in different areas, for example in different areas of the world such as Chicago, NY, Spain, Africa, etc., and based on available data in these regions, real-time or historical, as well as user demographics, among other data.

FIG. 1 illustrates an example system for identifying and mapping touch point data. The system includes one or more devices 122, a network 127, and a mapping system 121. The mapping system 121 may include a database 123 (also referred to as a geographic database or map database) and a server 125. Additional, different, or fewer components may be included.

The one or more devices 122 may include probe devices, probe sensors, IoT (internet of things) devices, or other devices 122 such as personal navigation devices 122 or connected vehicles. The devices 122 may be a mobile device or a tracking device that provides samples of data for the location of a person or vehicle. The devices 122 may include mobile phones running specialized applications that collect location data as the devices 122 are carried by persons or things traveling the roadway system. The devices 122 may also be integrated in or with a vehicle.

The one or more devices 122 may include dumb or non-networked physical devices and everyday objects that have been embedded with one or more sensors or data collection applications and are configured to communicate over a network 127 such as the internet. The devices may be configured as data sources that are configured to acquire and transmit touch point data. These devices 122 may be remotely monitored and controlled. The devices 122 may be part of an environment in which each device 122 communicates with other related devices in the environment to automate home and industry tasks. The devices may communicate usable sensor data to users, businesses, and, for example, the mapping system 121. As an example, multiple devices 122 may be located at a gas station/convenience store. The devices 122 may include, for example, sensors that track vehicular traffic, consumer traffic, pos (point of sale) activity, cleaning schedules, lighting, door operation, staffing activity, etc. Cameras, touch sensors, and other physical monitors may also be included in the devices 122. The devices 122 may include pressure sensors, proximity sensors, infrared sensors, optical sensors, or image sensors among others. The devices may collect data, process the data, and transmit data using the network 127. The data may range from simple counts (e.g. how many people walk through a door) to raw sensor data such as a video feed. The data may be further analyzed and processed by devices such as local servers/gateways, cloud services, or may be transmitted and stored in the geographic database 123 as touch point data.

Figure 2:
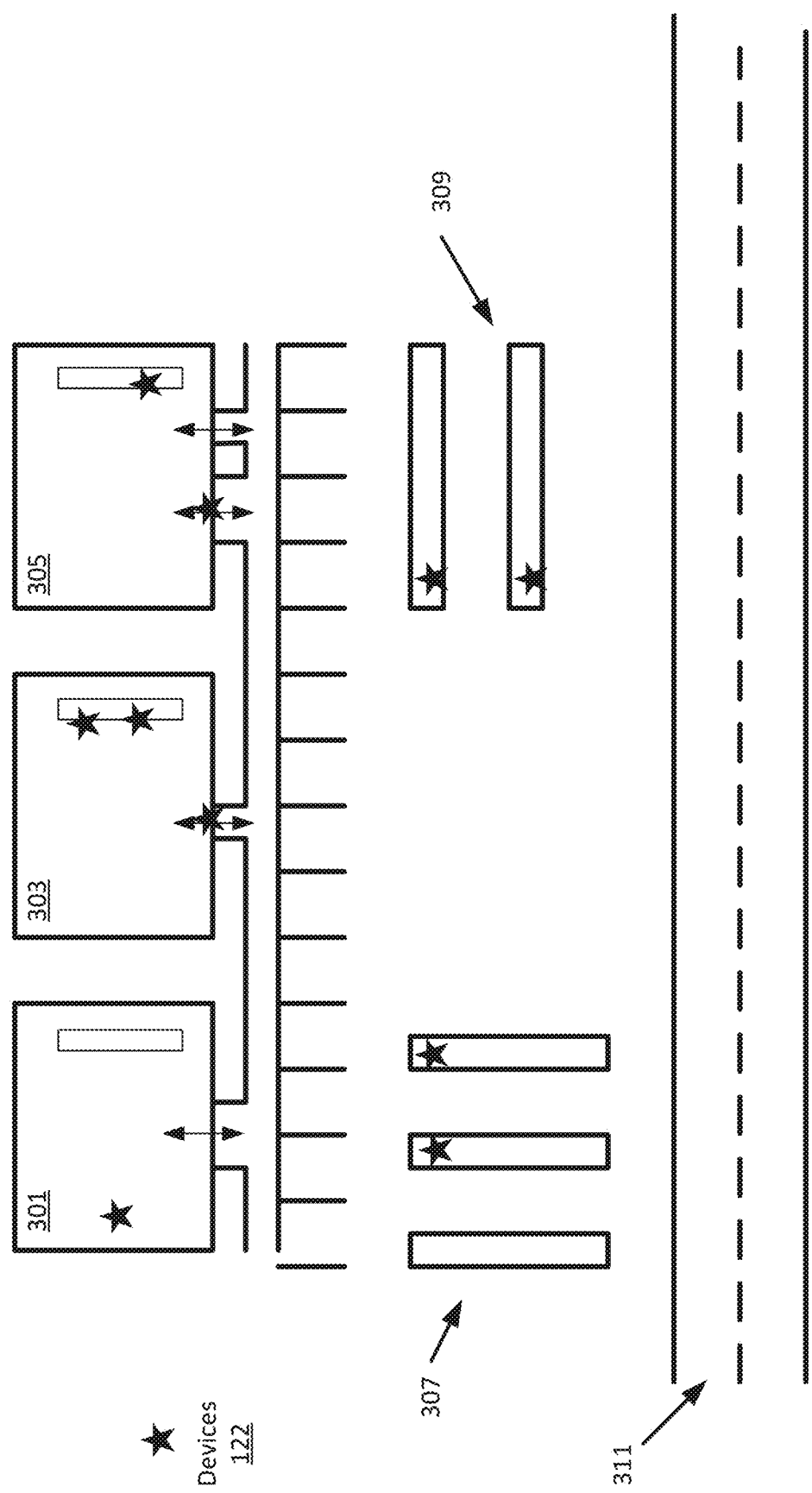
FIG. 2 depicts an example of multiple devices at different locations according to an embodiment.

FIG. 2 depicts example devices in a strip mall setting. FIG. 2 includes a roadway 311 and three stores/places of businesses 301, 303, 305. As depicted, two of the businesses are gas stations and include pumping areas 307 and 309. Devices that are configured to acquire touch point data are marked with a star. For example, in the first store 301, there may be device 122 configured as a camera. The second store may include multiple devices, for example, one that monitors the door and two that monitor the point of sale area. Several of the gas pumps may also include sensors such as pressure sensors, proximity sensors, infrared sensors, optical sensors, or image sensors among others. Each of these sensors may collect data relating to touches. The touch point data may be aggregated for each of the businesses 301, 303, 305 or may be stored as individual data points for each object or location. Additional touch point data may also be collected from user devices or entered manually by operators of the businesses 301, 303, 305. The data may be dynamic or static. Dynamic data changes over time whereas static data does not. An example of dynamic data is recording actual or predicted touches such as using a camera or pressure sensor. An example of static data is status data relating to an area or object, for example if a place of business has automatic doors or manual doors.

The devices/data sources may be configured to track a frequency of cleaning or disinfecting. Cleaning refers to the removal of dirt and impurities, including germs, from surfaces. Cleaning alone does not kill germs. By removing the germs, it decreases their number and therefore any risk of spreading infection. Disinfecting works by using chemicals to kill germs on surfaces. This process does not necessarily clean dirty surfaces or remove germs. But killing germs remaining on a surface after cleaning further reduces any risk of spreading infection. Cleaning and disinfecting may be tracked manually or automatically.

The devices/data sources may be configured to identify or monitor attributes of objects or locations. For example, the devices may identify whether or not a point of sale (pos) system is contactless or requires a transfer of paper money. In an example, near field communications (NFC) payments known as contactless would indicate lower touch points than a classic point of sale operation. Remote app payments that happen far away from a point of sale (POS) system may be even better in lowering touch points. Additional example attributes for the example gas station or convenience store described above may include plexiglass shields at cash registers, closing down hot food bars, offering hand sanitizer to customers and packaging bakery items that are usually loose in bins, such as fresh doughnuts and pastries. Each of these settings or values may be identified by a device 122 and transmitted to the mapping system 121. The mapping system 121 uses these attributes and touch point data to calculate touch scores which may then be presented or used by an end user, for example, on a mobile device 122 of the one or more devices 122.

The mapping system 121 may include multiple servers, workstations, databases, processors, and other machines connected together and maintained by a map developer. The mapping system 121 may be cloud based. The mapping system 121 may be configured to identify or estimate touch points/contact instances for objects and points of interest. The mapping system 121 may be configured to calculate touch scores for each object and points of interest, for example, in real time based on touch data acquired from the one or more devices 122. The mapping system 121 may be configured to distinguish between different types of points of interest (e.g. gas station vs. supermarket), between the same types of location (e.g. gas station A vs. gas station B), and even more granular between objects at a location (e.g. pump 1 at gas station A vs. pump 2 at gas station A). The mapping system 121 may also be configured to generate routes or paths between two points (nodes) on a stored map. The mapping system 121 may be configured to provide up to date information and maps to external geographic databases or mapping applications. The mapping system 121 may be configured to encode or decode map or geographic data. The identified touch point data, scores, and estimations may be stored by the mapping system 121 in the geographic database 123 as link, segment, node, or object attributes.

Figure 3:
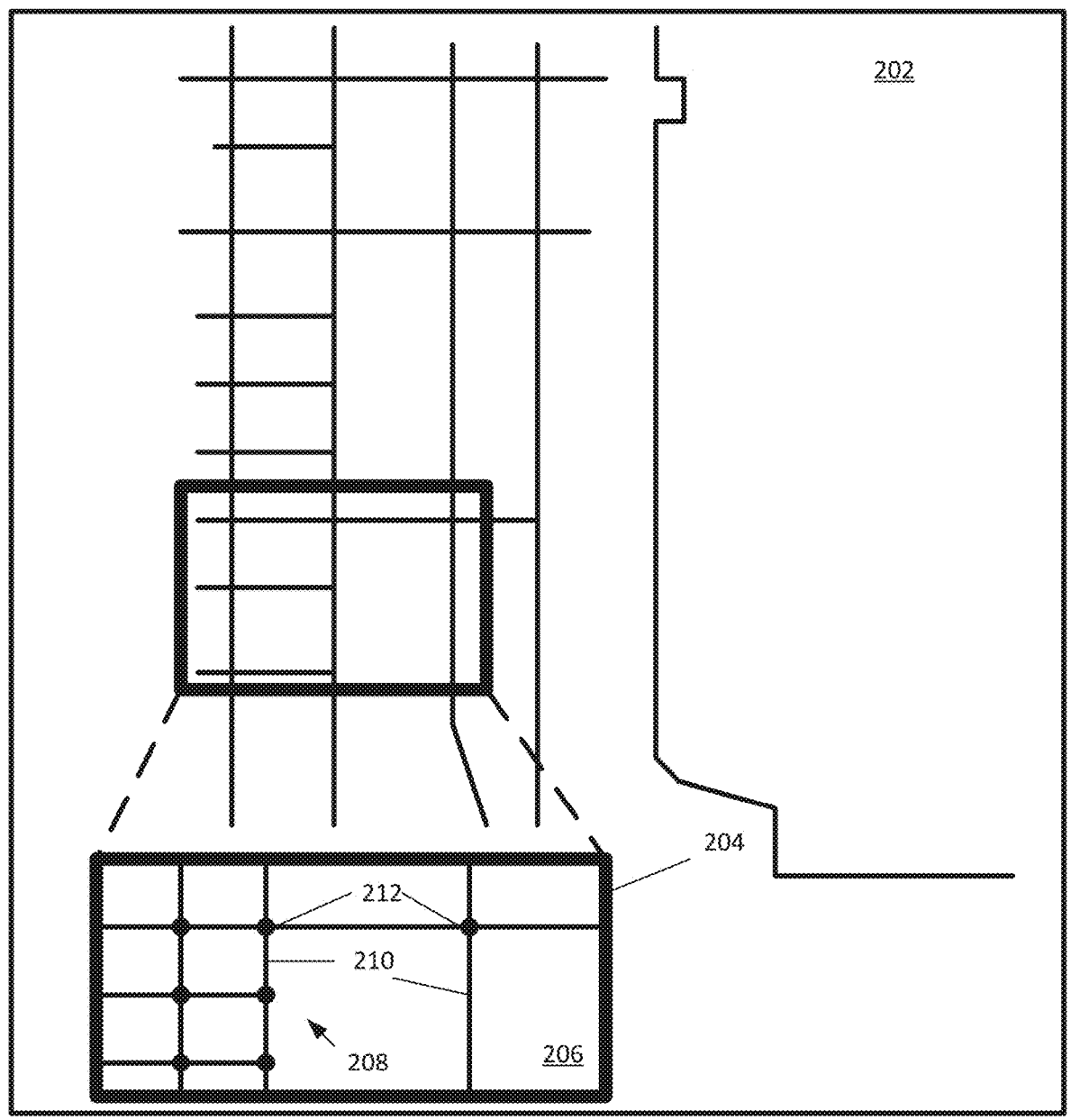
FIG. 3 depicts a map of a geographic region.

In order to provide navigation-related features and functions to the end user, the mapping system 121 uses the geographic database 123. The geographic database 123 includes information about one or more geographic regions. FIG. 3 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 3 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 4:
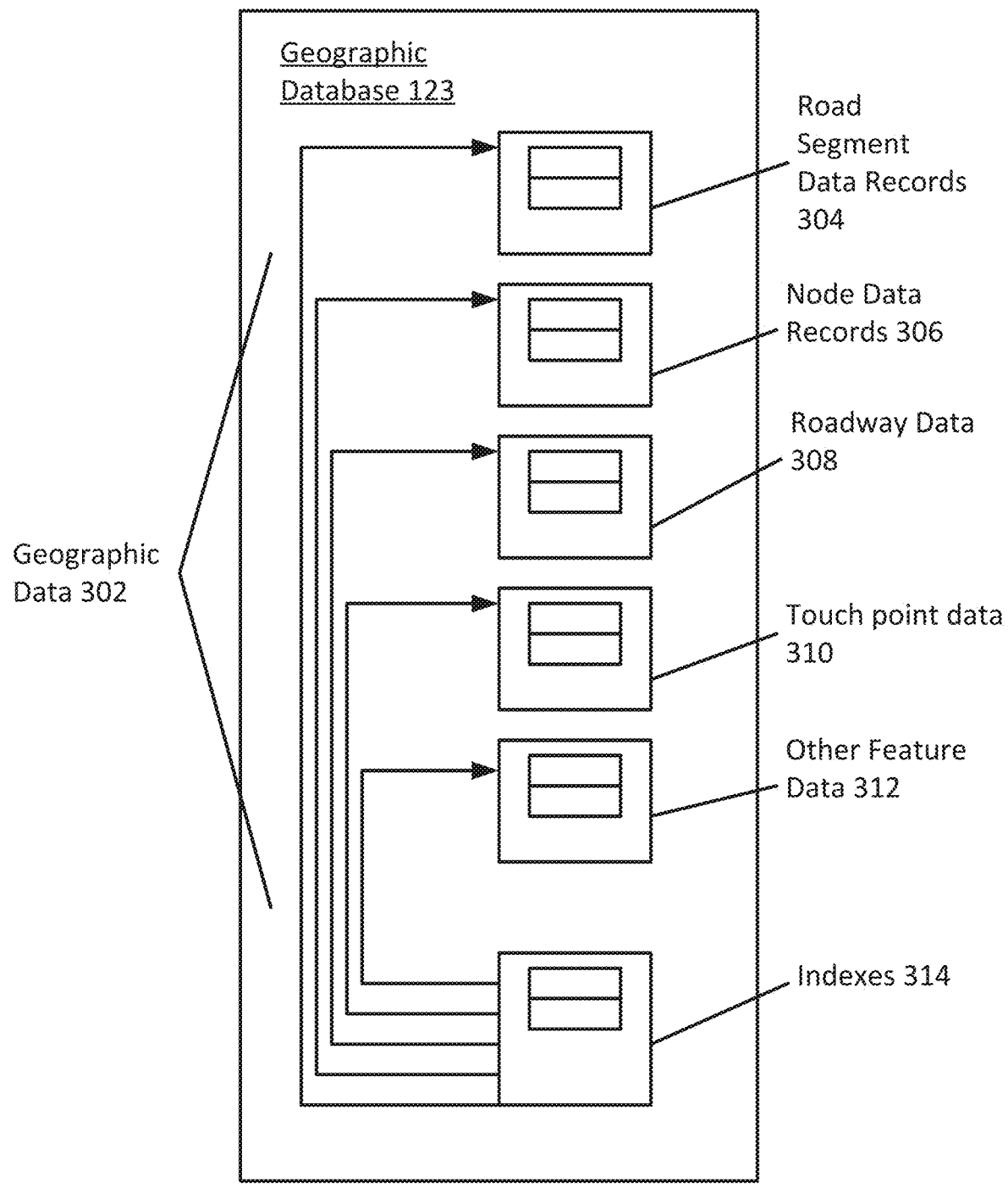
FIG. 4 depicts a block diagram of a geographic database of FIG. 1.

As depicted in FIG. 4, in one embodiment, the geographic database 123 contains geographic data 302 that represents some of the geographic features in the geographic region 202 depicted in FIG. 3. The data 302 contained in the geographic database 123 may include data that represent the road network 208. In FIG. 4, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges etc. The roadway data 308 may be further stored in sub-indices that account for different types of roads or features. The feature data 312 may include point of interest data or other roadway features. The point of interest data may include point of interest records comprising a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

The geographic database 123 includes touch point data 310. The touch point data 310 may be stored as feature data or in a separate layer or index. The touch point data 310 may be stored for individual objects/locations or may be aggregated into touch point data 310 for point of interests or waypoints. The touch point data 310 may include raw touch point data 310, for example actual or estimated touches over a period of time. This data may be acquired and stored for over multiple time periods. Missing data may be estimated from the stored historical data or may be used to smooth out abnormalities. An average or other calculated number of touches may be calculated from the raw data and stored for each object or point of interest. Additional attributes for the objects or point or interests may also be stored in the touch point data layer. In an example of a gas station or convenience store, data may be acquired and stored for different objects such as gas pumps, pos stations, doors, bathrooms, air pumps, etc. The data may include, in addition to or instead of touch points, cleaning schedules, presence or absence of touchless features, ventilation data, etc.

The touch point data 310 may be used by the mapping system 121 to generate a score for an object or point of interest using one or more algorithms. Multiple scores may be generated for an object or point of interest using different algorithms and the touch point data 310 and attributes of the object/point of interest. As an example, there may be different algorithms used for different contagions or issues.

Each algorithm may weigh the touch point data 310 and attribute data differently. For example, ventilation data may be very important and thus weighted more in a certain algorithm, while a different algorithm gives more weight to the frequency of the cleaning schedule or the touch point data 310. One contagion may spread easily on surfaces while another spreads through the air. One contagion may prefer warmer weather, while another cannot spread above a certain temperature. The algorithms may be adjusted for different uses and may be updated as additional data or information is acquired. In operation, the score data may be used by a routing algorithm provided by the mapping system 121 to generate routes from a starting point to a destination. The score data may also be used to directly provide information to a user, for example on a user interface. The touch point data 310 and attributes of objects and points of interests may be updated as new data is acquired, for example in real time. In certain locations where data may not be collected or may not be collected frequently, estimates may be generated based on the object or point of interest types. For example, a score may be calculated and stored for a typical gas stations in a region when the data is unavailable allowing for null data to be avoided when using routing algorithms.

Figure 5:
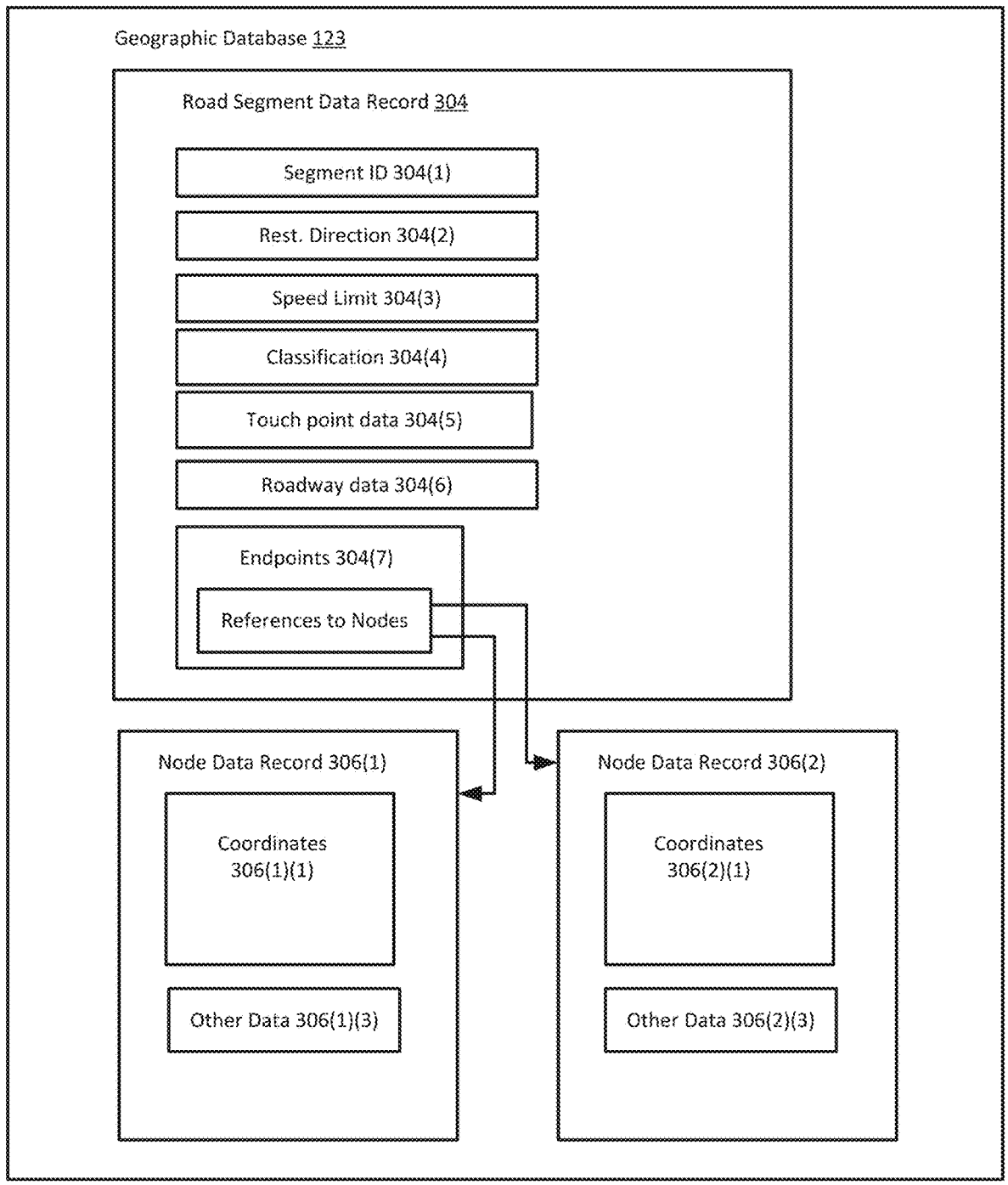
FIG. 5 depicts records in a geographic database according to an embodiment.

FIG. 5 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with the data record, information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on. The road segment data record 304 may also include data 304(5) for touch points. The touch point data may be associated with geographic coordinates as well as metadata giving more context and description. The road segment data record 304 also includes roadway data 304(6) and endpoint data 304(7) that may provide the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 5 also depicts some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 4, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway. Remote sensing, such as aerial or satellite photography, may be used. The database 123 is connected to the server 125. The geographic database 123 and the data stored within the geographic database 123 may be licensed or delivered on-demand. Other navigational services or traffic server providers may access the traffic data and the touch point data 310 stored in the geographic database 123. Data including the touch point data 310 for an object or point of interest may be broadcast as a service.

The server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the links, segments, paths, or routes using historical, recent, or real time collected data. The server 125 may be configured to analyze collected touch point data to calculate a touch point score (or other scores) for objects or point of interests. The server 125 may be configured to analyze data from objects or point of interests to determine correlations between similar types of objects or point of interests. For example, objects or point of interests with similar touch point scores may have similar profiles.

The server 125 is configured to communicate with the devices 122 or a gateway device 122 through the network 127. The server 125 is configured to receive a request from a device 122 for a route and generate one or more potential routes using at least the touch point data stored in the geographic database 123. The server 125 may also be configured to receive the touch point data from one or more systems or services that may be used to calculate scores or predict touch point data. To communicate with the systems or services, the server 125 is connected to the network 127. The server 125 may receive or transmit data through the network 127. The server 125 may also transmit paths, routes, or touch point data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network may be a public network, such as the Internet, a private network, such as an intranet, or combinations thereof, and may utilize a variety of networking protocols now available or later developed including, but not limited to transmission control protocol/internet protocol (TCP/IP) based networking protocols.

The device 122 may be integrated into an autonomous vehicle or a highly-assisted or highly-automated driving (HAD) vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. The autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to avoid or comply with a routing or driving instruction from the device 122 or a remote mapping system 121.

The device 122 may be configured as a navigation system for an autonomous vehicle or a HAD. Any of these assisted driving systems may be incorporated into the device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125. An autonomous vehicle or HAD may take route instructions based on a road segment and node information provided to the navigation device 122. An autonomous vehicle or HAD may be configured to receive routing instructions from a mapping system 121 and automatically perform an action in furtherance of the instructions.

A HAD vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the position of the vehicle and routing instructions.

ADAS vehicles include one or more partially automated systems in which the vehicle alerts the driver. The features may be used to provide alerts to the operator regarding upcoming features. ADAS vehicles may include adaptive cruise control, automated braking, or steering adjustments to keep the driver in the correct lane. ADAS vehicles may issue warnings for the driver based on the position of the vehicle either on a roadway or within a road network system.

Figure 6:
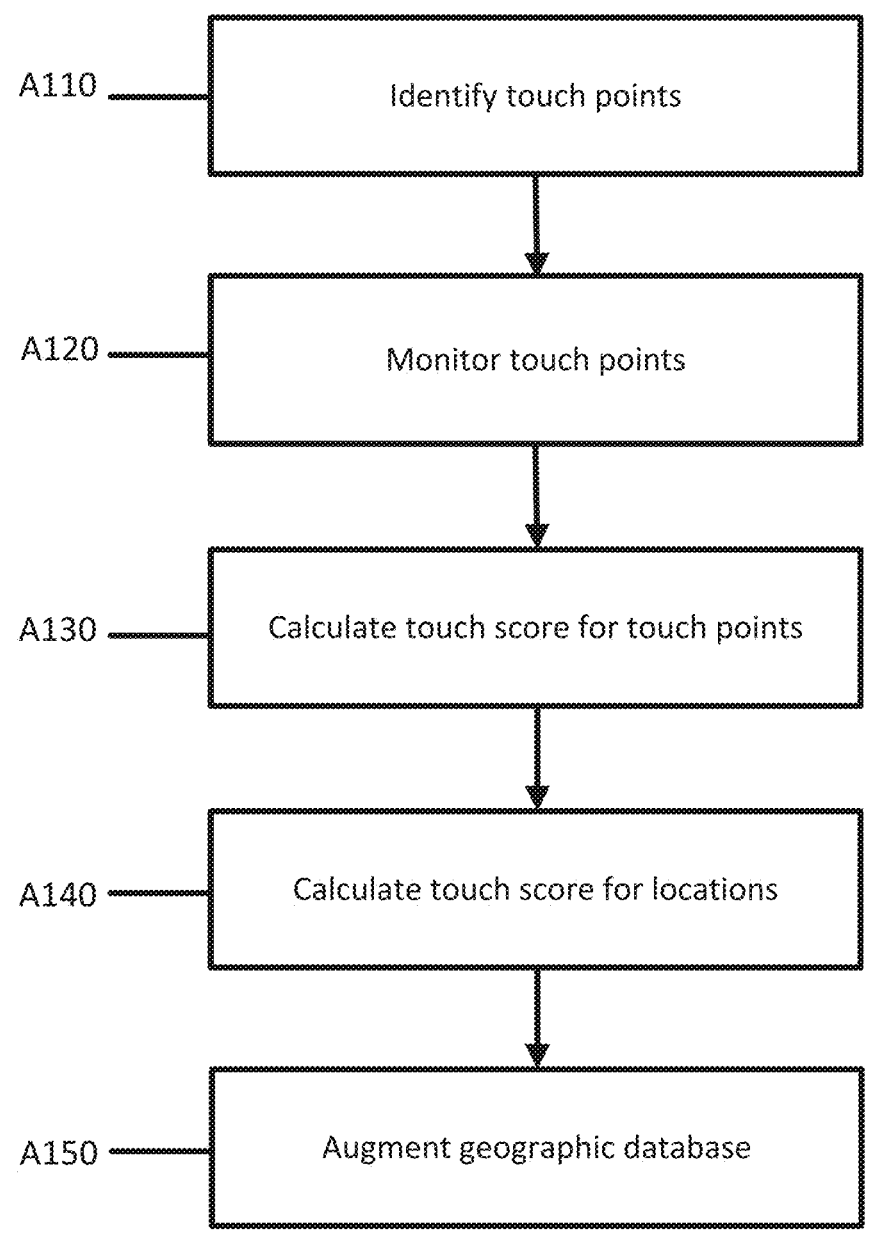
FIG. 6 depicts an example flowchart for augmenting a geographic database with touch point data according to an embodiment.

FIG. 6 illustrates an example flow chart for augmenting a geographic database 123 with touch point data. As presented in the following sections, the acts may be performed using any combination of the components indicated in FIG. 1, 7, or 8. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A110, the mapping system 121 identifies, in a geographic database 123, a plurality of touch points for a plurality of locations. The touch points may include any object or location that a person may touch or come into contact with. In an embodiment, the objects are any type object or material that is capable of carrying an infection such as bacteria or a virus. The materials or objects may, for example, be able to harbor an agent that is capable of causing an infection or causing a disease or otherwise negative effect for a user. The touch points may include inanimate objects that can become contaminated with infectious agents and serve as a mechanism for transfer between hosts. Such touch points may include, for example, self-checkout machines, electronic pen-and-pad systems that customers use, gas pump handles, door handles, etc.

Each object or location may be stored in the geographic database 123 with location information, for example, as it relates to link data, node data, or coordinate data. One or more touch points for objects may be associated with a point of interest. In an example, a gas station (point of interest) includes and/or is related to multiple objects such as fuel pumps, doors, point of sales, bathrooms, food providers, etc. In an embodiment, business owners may provide indoor or interior maps to the mapping system 121 with locations for objects. These interactive indoor maps may be used to provide indoor routing that allows routing across campuses, buildings, malls, etc.

At act A120, the plurality of touch points is monitored for touch instances. The mapping system 121 receives data from one or more source devices that are configured to acquire data relating to the plurality of touch points. The devices may automatically monitor the touch points or may be, for example, use a manual reporting mechanism. One example of a device 122 may be a camera or imaging system that identifies when an object is touched. Another example may be a sensor that identifies when a certain object is used or interacted with. Touch point data may also be derived or estimated from data such as sales or purchase data. Touch point data may also be derived or estimated from personal user devices such as smart phones or other tracking mechanisms for users. The touch point data may be static or dynamic. Static touch point data may not change over time such as object configurations. Static touch point data may be based on object or location attributes such as, for example, material properties or locational data. An example may be a touchless door versus a door that must be touched to open. Static data may also be used for objects or locations where, for example, dynamic data is not available. If there are no sensor data or actual collection, a value may be assigned to an object. Dynamic data changes over time and may include both historical and real time data. Dynamic data may be based on observations or estimates.

The result of the monitoring is a count or estimation of touches or contacts with a touch point for a period of time. The period of time may be dependent on the sensor or monitoring device 122. A camera or video monitoring system may provide real time dynamic data relating to touches while manual data may be updated once a day. The touch point data may be normalized to a standard time period, for example touches per minute, touches per hour, touches per day etc. An estimate for certain objects may be calculated based on controlled studies. An example study may include inoculating commonly used surfaces (i.e., telephone, faucet, copier button, or doorknob) with either powdered or spray fluorescent resin, visible only under black light, and measuring objects in the environment for the presence of the invisible dye by exposure to black light. The resulting touches may be extrapolated over a period of time and used for static data. This type of static touch point data may be used as a baseline or average value for objects or points of interests in the geographic database 123 that are not monitored or measured directly.

At act A130, the mapping system 121 calculates a touch score for each of the touch points based on a number of touch instances. At act A140 the mapping system 121 calculates a location touch score for the plurality of locations based on the touch scores for touch points of the plurality of touch points associated with each of the plurality of locations. Acts A130 and A140 may be combined depending on the point of interest or object. In an example, if a point of interest only includes one object, then the score for the point of interest may be the same as the score of the object. However, if a point of interest includes multiple objects, then a score for the point of interest may be an aggregation of the scores of the associated objects. Both scores may be stored in the mapping system 121 and used, for example, for routing or presentation to a user. In an example, point of interest scores may be more useful when calculating a route for a vehicle, while the object scores may be more useful when provide information to a user in an indoor space or allowing the user to choose between using one object or another. In an example, the point of interest scores may be used to direct a user to one gas station or another, while the object scores may be used to direct a user to one pump or another after arriving at a particular gas station. The touch scores may be normalized or standardized between locations so that an accurate comparison may be performed.

Different algorithms may be used to calculate different touch stores for the touch points depending on the scenario. One algorithm, for example, may calculate a touch score that is related to a certain virus with certain attributes while a different algorithm may calculate the score differently for a different scenario (such as cleanliness). Multiple inputs may be used to calculate the touch score. In addition to the number of touches, attributes for the object or material and environmental conditions may be used to calculate the touch score. Attributes such as cleanliness and disinfection (such as routine cleaning, available hand-sanitizing stations, and private showers), proper food handling and food service (such as replacing self-service with full service), contactless payment and interaction, and others may be used to calculated the score. Additionally, information or attributes of the scenario that is being scored may be used. In the example of calculating a touch score in light of a virus, measured and predictable factors that influence viral survival on surfaces include fomite properties, initial viral titer, virus strain, temperature, humidity, and suspending medium. Intrinsic factors, like object properties, virus strain, and viral inoculation titer, consistently impact the total virus survival end point (hours, days). Extrinsic environmental factors, such as temperature, humidity, and surrounding viral medium, have a varying effect on viral decay rate, depending on the viral strain and may be used in the calculation. For an infectious scenario, an infected person coughs or sneezes on their hands. Some of the droplets may splash onto a nearby surface, or the person spreads the germs by touching a surface before washing their hands. Studies show that certain viruses can last up to or longer than three days on plastic and steel, but once it lands on a surface, the amount of viable virus begins to disintegrate in a matter of hours. That means a droplet on a surface is far more infectious right after the sneeze—not so much a few days later. As such, the touch point data may be degraded or diminished over time, for example by giving more weight to more recent touch point data or touches. Cleaning and disinfecting schedules may also reset scores.

At act A150, the geographic database 123 is augmented with the touch score for each of the touch points and/or plurality of locations. The scores may be calculated as soon as new data is acquired, e.g. in real time, or may be updated at specific intervals. The geographic database 123 may be accessed by the devices 122 or the mapping system 121 to generate a route or provide information to a user. In an example use case, a user requests a route to a desired destination using an application interface on a mobile smart phone, GPS Navigation System, Tablet, and/or other digital/probe device 122. The user may be looking for a gas station for gas or electric charging port and coffee/snacks using a navigation app. The navigation application on the user's device 122 stores a copy of or accesses the geographic database 123 to determine values or ratings for destinations or waypoints. POIs and destinations with less or lower touch point scores may be given lower priority for routing purposes. The POIs and destinations with more touch points may be given a lower, less desirable scores to sway and/or guide the user to another POI and/or destination with fewer touches or touch points, based on real-time data and historical data and information. The navigation application of the device 122 calculates one or more routes based on user preferences. If, for example, the user desires a route with fewer interactions with touch points, then a routing algorithm may take the scores into account when calculating the route. The routes may be presented to or transmitted to a device 122 such as a smart phone or navigation device 122. The route calculation and score/rating calculation may be performed by a server 125 that is configured as part the mapping system 121.

Figure 7:
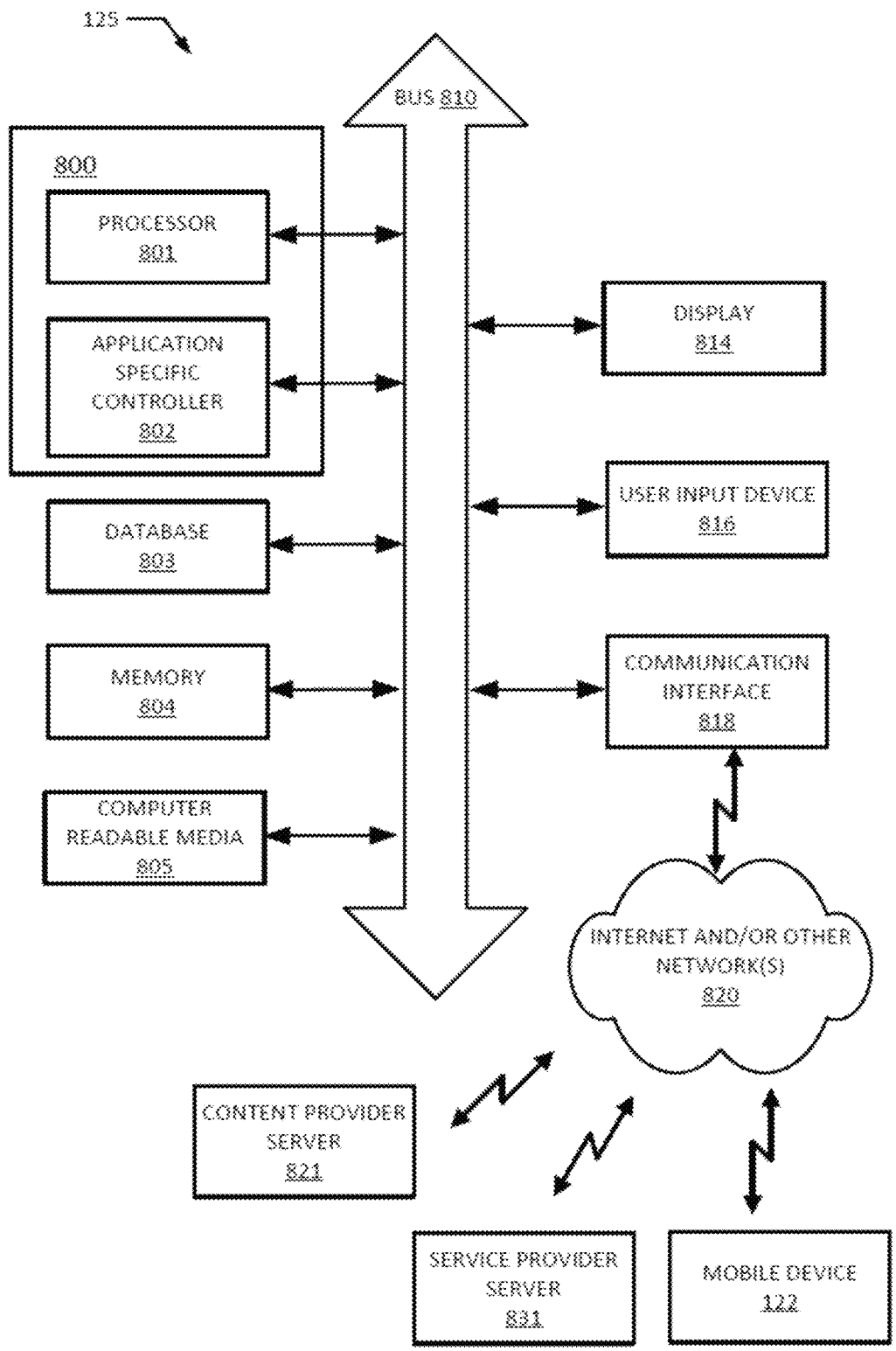
FIG. 7 depicts an example server of FIG. 1.

FIG. 7 illustrates an example server 125 for the system of FIG. 1. The server 125 may include a bus 810 that facilitates communication between a controller that may be implemented by a processor 801 and/or an application specific controller 802, which may be referred to individually or collectively as controller 800, and one or more other components including a database 803, a memory 804, a computer readable medium 805, a display 814, a user input device 816, and a communication interface 81 connected to the internet and/or other networks 820. The contents of database 803 are described with respect to database 123. The server-side database 803 may be a master database that provides data in portions to a database of the mobile device 122. Additional, different, or fewer components may be included.

The geographic database 123 is configured to store touch point data and touch point scores for a plurality of potential waypoints in multiple different routes from the starting location to the destination, the touch point scores representative of an estimated number of touches of objects or materials that are likely to carry an infection at each of the plurality of potential waypoints. The estimated number of touches may be based on real-time acquired touch data, historical acquired touch data, or predicted based on similar locations. The touch point data may be acquired manually or automatically from devices at each of the potential waypoints. The potential waypoints may include points of interests or other objects or locations that may include objects or materials that are likely to carry an infection. An infection may include any substance that may be harmful, hazardous, or dangerous. The hazardous material may, for example, be able of causing an infection or causing a disease or otherwise negative effect for a user.

The memory 804 and/or the computer readable medium 805 may include a set of instructions that can be executed to cause the server 125 to perform any one or more of the methods or computer-based functions disclosed herein. In a networked deployment, the system of FIG. 7 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions.

The server 125 may be in communication through the network 127/820 with a content provider server 821 and/or a service provider server 831. The server 125 may provide mapping data, for example touch point data, to the content provider server 821 and/or the service provider server 831. The content provider may include device manufacturers that provide location-based services associated with different locations POIs that users may access.

The server 125 may be configured to search the geographic database 123 for answers to queries by a user. For example, a user may request a gas station that has low or lower levels of touches. The server 125 may search an index of point of interests to identify possible gas stations using estimated, and/or predicted touchpoints at each gas station, the user's geographic position, the user's profile (demographic information age, lifestyle data, etc.), vehicle type (small vehicle, large vehicle, truck, bicycle, etc.), gas type, availability of (rapid) electric vehicle charging stations, plus other known data to arrive at an optimal gas station for the user. The server 125 may be configured to generate a route for a user from a starting point to a destination. A user may request, as in the example above, a route to a gas station that includes a lower level of touches. The server 125 is configured to identify a gas station and provide a route that may include waypoints that have low levels of touches or estimated touches. Such a route may include fewer or no opportunities for a user to interact with any objects that could possibly transmit a contagion. The server 125 is configured to configured to generate one or more touch point routes comprising one or more of the potential waypoints based on the touch point scores and at least one of a shortest distance or shortest travel time from the starting location to the destination. The touch point scores are calculated from the estimated number of touches and an actual measured number of touches. The actual measured number of touches are measured by one or more sensors at respective waypoints of the plurality of potential waypoints. The one or more sensors may include any of pressure sensors, proximity sensors, infrared sensors, optical sensors, image sensors, among others.

The touch point scores are calculated from the estimated number of touches and respective object or material properties. The object or material properties comprise at least a cleaning schedule for the respective object or material. The cleaning schedule may be manually or automatically updated, data for which is stored in the geographic database 123. The object or material properties include at least an attribute relating to whether or not the object or material comprises a touchless system. As an example, an attribute for a door may indicate whether it is an automatic door or requires a push. An elevator may require button pushes or may be automatic and touchless. A point of sale may require an interaction with a clerk or may be automatic and touchless. A restaurant may include indoor only seating or may have an open outdoor area. A store may have installed a ventilation system. The history of the object or location may also be used in calculating the score, for example if there had been any known transmission or outbreaks at a location, the location may receive a lower score.

Figure 8:
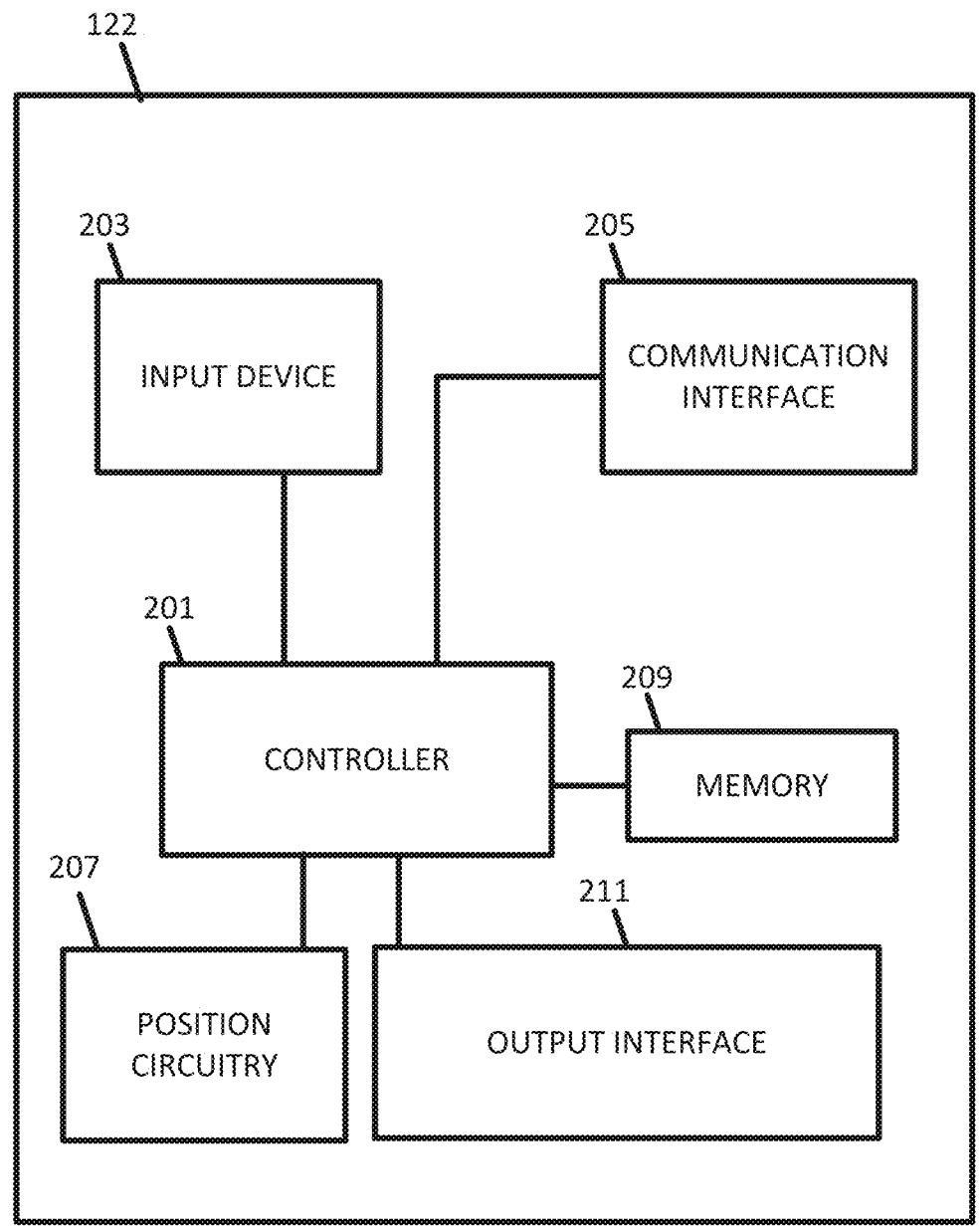
FIG. 8 depicts an example device of FIG. 1.

FIG. 8 illustrates an example device 122 of the system of FIG. 1 that may be configured to collect, receive, and present touch point data. The device 122 may be configured to collect, transmit, receive, process, or display data. The device 122 may also be referred to as a probe 122, a mobile device 122, a data source 122, or a navigation device 122. The device 122 includes a controller 201, a memory 209, an input device 203, a communication interface 205, position circuitry 207, and an output interface 211. Additional, different, or fewer components are possible for the device 122. The device 122 may be smart phone, a mobile phone, a personal digital assistant (PDA), a tablet computer, a notebook computer, a stationary computer, a IoT device, a remote sensor, a personal navigation device (PND), a portable navigation device, and/or any other known or later developed device that is configured to collect, transmit, receive, process, or display data. In an embodiment, a vehicle may be considered a device 122, or the device 122 may be integrated into a vehicle. The device 122 may receive or collect data from one or more sensors such as pressure sensors, proximity sensors, infrared sensors, optical sensors, image sensors, among others.

The device 122 may be configured to receive touch point data from a mapping system 121. The device 122 may receive data such as a route that is generated by a mapping system 121. The device 122 may receive touch point data and generate the route. The device 122 may generate and/or store the route or instructions in a memory 209. The memory 209 may be a volatile memory or a non-volatile memory. The memory 209 may include one or more of a read only memory (ROM), random access memory (RAM), a flash memory, an electronic erasable program read only memory (EEPROM), or other type of memory. The memory 209 may be removable from the mobile device 122, such as a secure digital (SD) memory card. The memory may contain a locally stored geographic database 123 or link node routing graph. The locally stored geographic database 123 may be a copy of the geographic database 123 or may include a smaller piece. The locally stored geographic database 123 may use the same formatting and scheme as the geographic database 123.

The controller 201 may include a general processor, digital signal processor, an application specific integrated circuit (ASIC), field programmable gate array (FPGA), analog circuit, digital circuit, combinations thereof, or other now known or later developed processor. The controller 201 may be a single device or combinations of devices, such as associated with a network 127, distributed processing, or cloud computing. The controller 201 may receive updated instructions, traffic data, or other data such as touch point data. The controller 201 may be configured to acquire, store, score, and present touch point data to a user or user interface as described herein.

The communication may be performed using a communications interface 205. The communications interface 205 may include any operable connection. An operable connection may be one in which signals, physical communications, and/or logical communications may be sent and/or received. An operable connection may include a physical interface, an electrical interface, and/or a data interface. The communications interface 205 provides for wireless and/or wired communications in any now known or later developed format. The communications interface 205 may include a receiver/transmitter for digital radio signals or broadcast mediums.

The communications may include information related to touch point data, routing, or other navigation service. The information may be displayed to a user or occupant of the vehicle using an output interface 211. The output interface 211 may be a liquid crystal display (LCD) panel, light emitting diode (LED) screen, thin film transistor screen, or another type of display. The output interface 211 may also include audio capabilities, or speakers.

The communications may include information such as route guidance or traffic conditions. The communications may include an instruction for an action to be taken by the vehicle. In an embodiment, the controller 201 performs the instructions automatically. The device 122 may be integrated into an autonomous vehicle or a highly-assisted or highly-automated driving (HAD) vehicle. The device 122 may be configured as a navigation system for an autonomous vehicle or a HAD. An autonomous vehicle or HAD may take route instruction based on the road segment and node information provided to the navigation device 122. An autonomous vehicle or HAD may be configured to receive instructions from a mapping system 121 or the controller 201 and automatically perform an action.

The device 122 may be integrated in the vehicle, which may include assisted driving vehicles such as autonomous vehicles, highly assisted driving (HAD), and advanced driving assistance systems (ADAS). Any of these assisted driving systems may be incorporated into device 122. Alternatively, an assisted driving device may be included in the vehicle. The assisted driving device may include memory, a processor, and systems to communicate with the device 122. The assisted driving vehicles may response to geographic data received from geographic database 123 and the server 125, which may have been updated.

Figure 9:
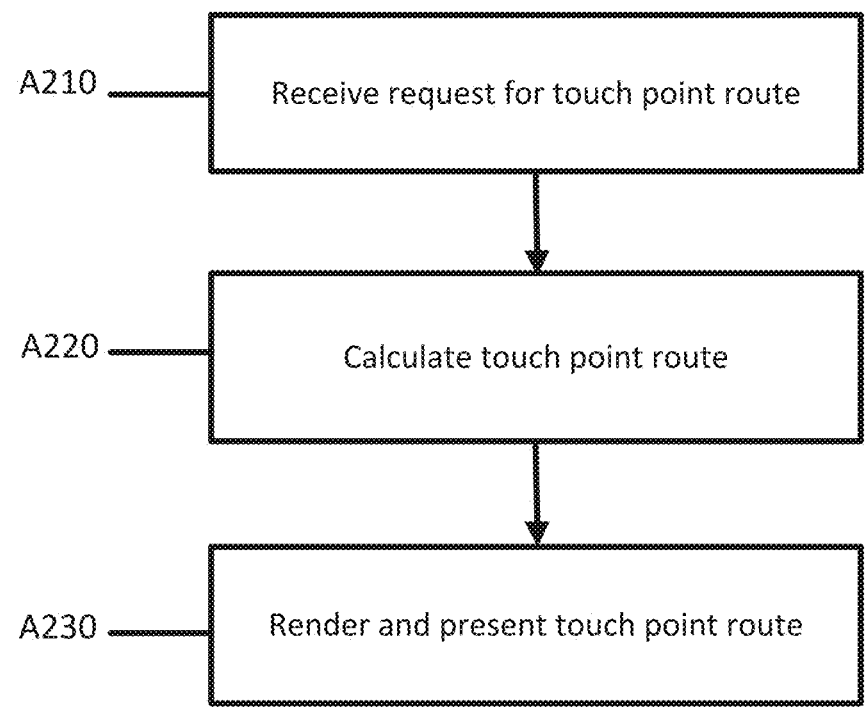
FIG. 9 depicts an example flowchart for providing a touch point route for a user interface according to an embodiment.

The controller and the output interface 211 may be configured to render and present a user interface to a user. FIG. 9 illustrates an example flow chart for providing a user interface to a user device 122. As presented in the following sections, the acts may be performed using any combination of the components indicated in FIG. 1, 7, or 8. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A210, an interface coupled with a processor/controller receives a request for a touch point route from a starting location to a destination on a rendered map. The starting location may be received from an input interface or, for example, be based on a current location of a device 122 that is identified, using, for example GPS or other locational services. The controller is configured to present in an interface/graphical user interface (GUI) rendered on a display coupled to a device 122, a digital map view. The digital map view may be rendered with a map or geographic view including one or more roadways, links, nodes, buildings, etc.

At act A220, the controller calculates, upon receipt of the selection, a touch point route from the starting location to the destination based on at least one of a shortest distance or shortest travel time from the starting location to the destination and a plurality of touch point scores for a plurality of potential waypoints in multiple different routes from the starting location to the destination, the touch point scores representative of an estimated number of touches of objects or materials that are likely to harbor a dangerous or hazardous material at each of the plurality of potential waypoints. The hazardous material may, for example, be able of causing an infection or cause a disease or otherwise negative effect for a user. The touch point route may be a vehicle route (car, bike, etc.) or a pedestrian route or a mix between the two. For example, the touch point route may include a route for a vehicle to a gas station and then a pedestrian route that details a route inside the gas station. The touch point route may thus cover both outdoor and indoors. Different rendered views may be used for outdoors and indoors.

The touch point scores are used by the controller to generate a touch point route, for example by including or excluding certain waypoints depending on their scores. The touch point route may include routing instructions for a vehicle or other mode of transportation. The touch point route may include routing instructions for an interior space.

At act A230, the controller renders and presents on the interface a representation of the touch point route. The touch point route may be rendered visually distinct from other possible routes. Waypoints may be rendered using one or more identifiers that indicate to a user the touch point score of the respective waypoint.

Figure 10:
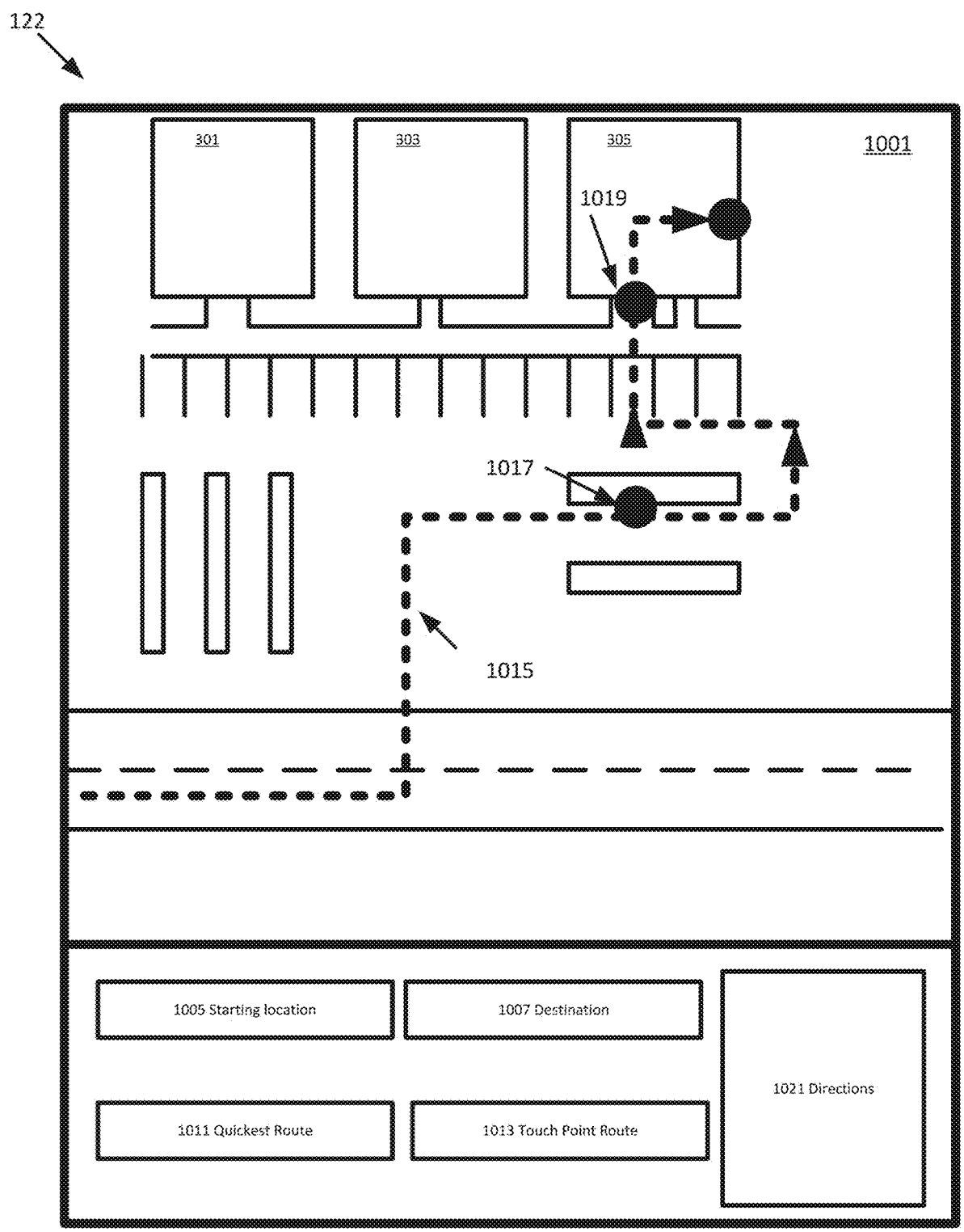
FIG. 10 depicts an example rendered digital map on an interface according to an embodiment.

FIG. 10 depicts an example touch point route rendered on a display of a device 122. The touch point route is shown with a dotted line 1015. The display includes a digital map view 1001 with several buttons/fields for a starting location 1005, destination 1007, quickest route 1011, and touch point route 1013. In operation, the user selects options for each of these fields. As depicted the user has selected a gas station as a destination and a touch point route 1013. The controller identifies gas station 305 as optimal based on touch point scores (instead of, for example gas station 301 which although closer, may have a worse touch point score or more recent touches). The controller also identifies gas pump 1017 as the best option (e.g. lower touch score than other pumps). The controller also identifies entry way 1019 which may be, for example touchless, as opposed to the other entry way. This information may all be rendered and presented to the user on the display. Additional information relating to scores may be rendered and presented, for example, using different patterns, colors, text, or numerical values.

At an additional act, the controller renders and presents on the interface upon arriving at the destination, a live view of the destination comprising at least one visual representation of a touch point score for an object at the destination. When a user arrives to the destination, the user interface may change and/or switch from a digital map view with recommended options, to a live view with recommendations such as safety precautions for the user. The interface may also provide detailed info to the user such as how many times a pump was used that day, when the pump was last used, when and what time the area (gas-pump) was last sanitized, how long the disinfectant used during cleaning will last, scheduled times for future sanitation efforts, etc.

Figure 11:
FIG. 11 depicts a live view of a location according to an embodiment.

FIG. 11 depicts a live view of an example gas station. FIG. 11 depicts several pumps and overlays using augmented reality. Detailed pump information may be included, for example the grade and when last used. Additional information relating to risk or scores may be rendered and presented, for example, using different patterns, colors, text, or numerical values.

A facilities manager may use the live view in a decision-making process. A manager may request that the controller or server layer, generate, or render a map with meta data for end users describing stationary hand sanitizer locations, and voice suggestions on the best way to enter/exit (grab a napkin before handling gas pump). An enterprise manager may use an application and the touch point data to visualize touch-points on a rendered dashboard. The data and rendered dashboard may be used to make business decisions, ERP analysis, and facilities management, among other uses. The rendered dashboard may be layered with $3^{rd}$ party sourced data such as cold medicine sales at surrounding pharmacies, real-time & historical data traffic data, hospital data, among other data. The use of the visualization may allow manager to implement or develop policies and technology options that allow and encourage contactless exchanges or operation such as no-signature checkouts, automatic doors, and deliver options for example. As an example, no signature systems limit contact, provide space, and avoid the sharing of items like pens and electronic signature pads between employees and individuals.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method using touch data to augment a geographic database, the method comprising:
   identifying, in a geographic database, a plurality of touch points for a plurality of locations;
   acquiring, by a processor, touch data for the plurality of touch points;
   calculating, by the processor, an object touch score for each of the plurality of touch points based on the touch data;
   calculating, by the processor, a location touch score for the plurality of locations based on object touch scores for touch points of the plurality of touch points associated with each of the plurality of locations; and
   augmenting, by the processor, the geographic database with the location touch scores and the object touch scores for the respective plurality of touch points and plurality of locations;
   wherein the location touch scores and object touch scores are configured to generate a touch aware route from a starting location to a destination location.

2. The method of claim 1, wherein the plurality of touch points comprises any point in a potential route where human contact is required with other humans, animals, or objects.

3. The method of claim 1, wherein the plurality of locations comprises points of interest stored in the geographic database.

4. The method of claim 1, wherein acquiring comprises receiving a number of actual touch instances or an estimate of touch instances from a sensor device at a respective location of the plurality of locations.

5. The method of claim 1, wherein monitoring further comprises identifying cleaning and disinfecting schedules for one or more of the touch points of the plurality of touch points.

6. The method of claim 1, wherein calculating the object touch score comprises weighting more recent touches higher than older touches for the touch points.

7. The method of claim 1, wherein calculating the object touch score is further based on a physical property of a respective touch point.

8. The method of claim 1, wherein calculating the location touch scores comprises averaging object touch scores for touch points of the plurality of touch points associated with the plurality of locations.

9. The method of claim 1, wherein the object touch scores and the location touch scores are calculated in real-time as touch data is acquired.

10. The method of claim 1, wherein the geographic database is further augmented with the touch data for the plurality of touch points.

11. A system for generating touch point routes from a starting location to a destination, the system comprising:
    a geographic database configured to store touch point scores for a plurality of potential waypoints in multiple different routes from the starting location to the destination, the touch point scores representative of an estimated number of touches of objects or materials that are likely to harbor a hazardous material at the plurality of potential waypoints; and
    a processor configured to generate one or more touch point routes comprising one or more of the potential waypoints based on the touch point scores and at least one of a shortest distance or shortest travel time from the starting location to the destination, the processor configured to provide the one or more touch point routes to a user device.

12. The system of claim 11, wherein the touch point scores are calculated from the estimated number of touches and an actual measured number of touches.

13. The system of claim 12, wherein the actual measured number of touches are measured by one or more sensors at respective waypoints of the plurality of potential waypoints.

14. The system of claim 13, wherein the one or more sensors comprise at least one of pressure sensors, proximity sensors, infrared sensors, optical sensors, or image sensors.

15. The system of claim 11, wherein the touch point scores are calculated from the estimated number of touches and at least one of respective object or material properties.

16. The system of claim 15, wherein the object or the material properties comprise at least a cleaning schedule for the respective object or the material properties.

17. The system of claim 15, wherein the object or the material properties comprise at least an attribute relating to whether or not the object or the material properties comprises a touchless system.

18. A computer implemented method comprising:
    receiving, by an interface coupled with a processor, a request for a touch point route from a starting location to a destination on a rendered map;
    calculating, by the processor upon receipt of the selection, the touch point route from the starting location to the destination based on at least one of a shortest distance or shortest travel time from the starting location to the destination and one or more touch point scores for one or more potential waypoints in multiple different routes from the starting location to the destination, the touch point scores representative of an estimated number of touches of objects or materials that are capable of harboring a hazardous material at the one or more potential waypoints; and
    rendering and presenting, by the processor on the interface, a representation of the touch point route.

19. The computer implemented method of claim 18, further comprising:
    rendering and presenting, by the processor on the interface upon arriving at the destination, a live view of the destination comprising at least one visual representation of an object touch point score for an object at the destination.

20. The computer implemented method of claim 18, wherein the estimated number of touches is estimated from data acquired by one or more sensors at the one or more potential waypoints that are configured to monitor an actual number of touches.

* * * * *